Oct. 16, 1951     C. W. PARISI     2,571,378
LEVEL INDICATOR
Filed March 22, 1946     2 Sheets-Sheet 1
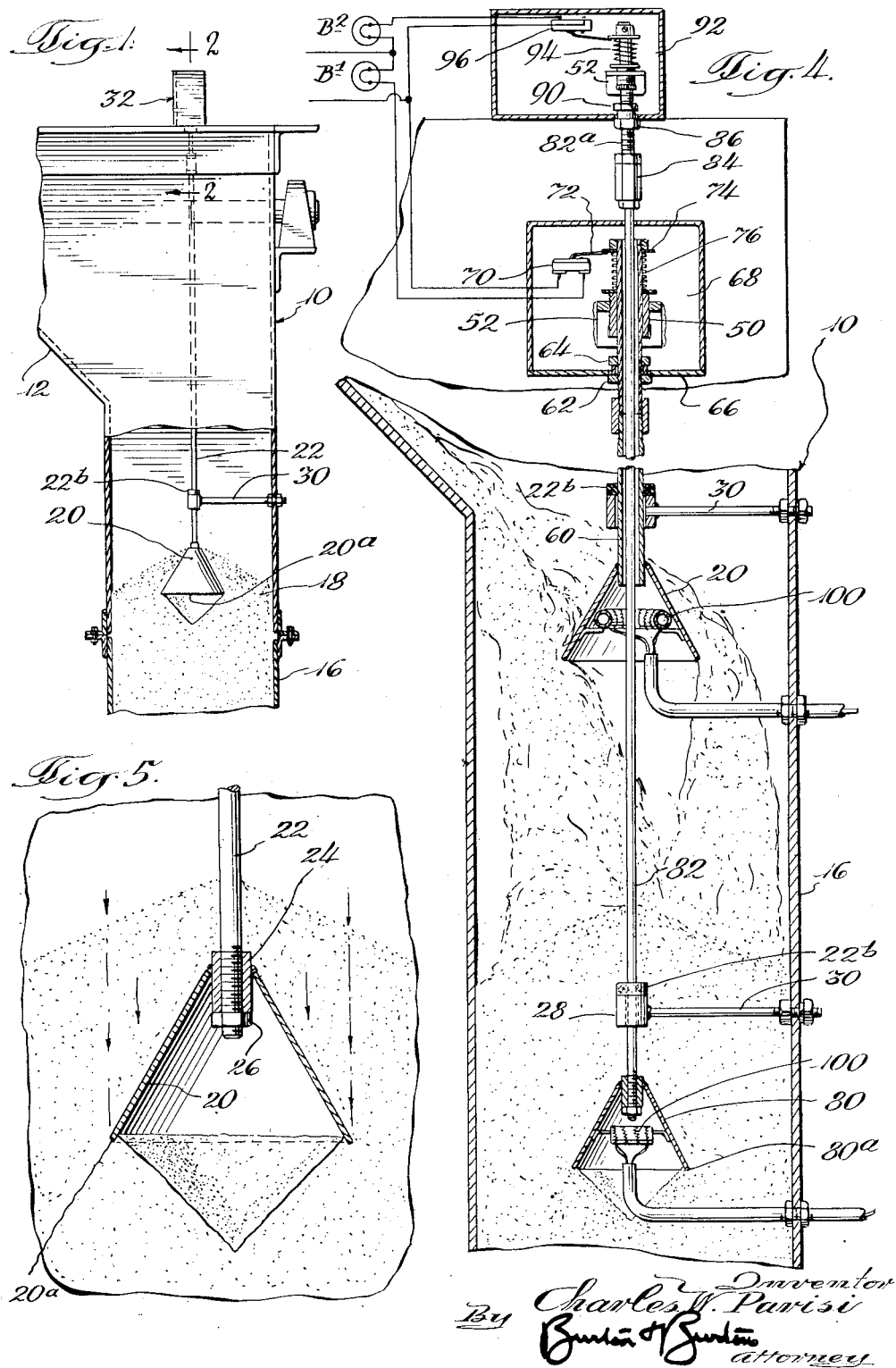
Inventor
Charles W. Parisi
By Burton & Burton
attorney Oct. 16, 1951     C. W. PARISI     2,571,378
LEVEL INDICATOR
Filed March 22, 1946     2 Sheets-Sheet 2
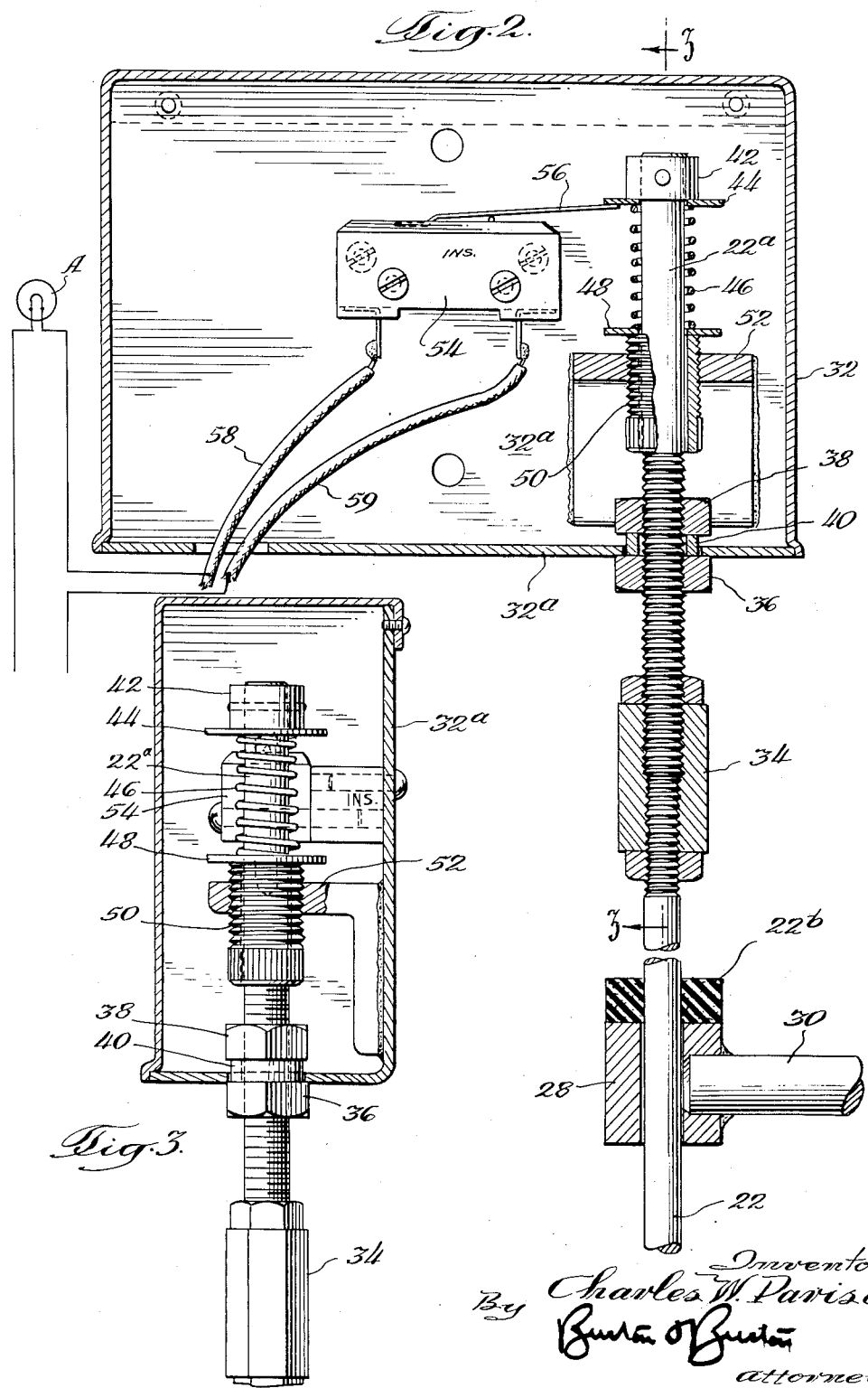

Patented Oct. 16, 1951

2,571,378

UNITED STATES PATENT OFFICE 2,571,378

LEVEL INDICATOR

Charles W. Parisi, Waywood, Ill., assignor to Jules T. Parisi, Chicago, Ill., doing business as Pekay Machine Company Application March 22, 1946, Serial No. 656,177

6 Claims. (Cl. 177—311)

This invention is concerned with means for handling and storing granular materials, including grain, sand, gravel and the like. It has been especially developed for use in connection with the feeding of molding sand employed in large foundries.

One object of the invention is to provide means for automatically indicating the level at which a quantity of granular material stands in a receptacle or bin.

Another object of the invention is to provide automatic means for giving notice that granular material in a receptacle to which it is being fed has reached a predetermined maximum level, or has been used until the level has receded to a predetermined minimum.

A further object of the invention is to provide a new and improved contact element for engagement with granular material and adapted to move in response to changes of level therein, together with means for registering such movement.

More specifically, the invention provides a downwardly open shell, preferably of conical form, which is supported against downward movement only by engagement of its annular rim surface with the granular material, but which is pressed downwardly with greater force by the weight of the material accumulating above said rim and resting upon the conical outer surface of the shell. Such a shell is connected to a vertically movable member which is arranged to actuate an alarm device or control mechanism employed in connection with regulating the feeding of material to the receptacle in which the level indicator is located.

Other objects and advantages of the invention will appear from the following description taken in connection with the drawings in which:

Fig. 1 is an elevation, partly in section, showing the bin containing granular material and equipped with a level indicator embodying this invention.

Fig. 2 is an enlarged vertical sectional view taken as indicated at line 2—2 on Fig. 1.

Fig. 3 is a detail section taken as indicated at line 3—3 on Fig. 2.

Fig. 4 is a vertical sectional view showing the invention arranged to indicate both maximum and minimum levels of material in a bin or receptacle.

Fig. 5 is an enlarged detail sectional view of the contact cone employed in the device.

There are various situations in which granular material is accumulated in a bin or receptacle, being fed into the upper portion thereof and withdrawn from the lower portion as needed. Such arrangements are frequently found in grain elevators and in various industrial plants in which such granular material is used as an ingredient of the product. In the process of molding metal castings the molding sand required by the workman may be supplied from bins in this manner, and the present invention has been developed in connection with such use.

Fig. 1 shows the upper portion of a bin 10 and includes a sloping side wall 12 along which, it may be understood, the material is fed by gravity so as to accumulate in the lower portion 16 which is defined by substantially vertical walls. Fig. 1 shows a quantity of granular material, such as molding sand, disposed in the lower portion of the bin at 18. To insure maintaining an adequate supply in each of the bins for the workman or group of workmen served thereby, it is desirable to have some means which indicates either that the supply is up to a predetermined level or that it has fallen below such level and should be replenished promptly before it is exhausted. The present invention provides means for giving this indication.

The indicating device includes a downwardly open shell, preferably of conical form, as shown at 20, the said shell being fixed to a vertically movable rod 22 which is attached to the shell adjacent its apex. As shown in Figure 5, the point of the conical member 20 may be omitted and a sleeve or bushing 24 welded in its place and threaded onto the lower end of the rod 22 with a nut 26 to retain it.

The rod 22 is guided for vertical movement in a sleeve 28 shown supported by a bracket arm 30 from the vertical wall of the bin 16 and extends upwardly into a switch box 32. The rod may be made in sections, threaded and connected together by a suitable coupling sleeve 34, as shown in Fig. 2, and the upper section 22a may have a pair of stop nuts 36 and 38 secured thereon in spaced relation above and below the lower wall 32a of the switch box, with a short spacer sleeve 40 between said nuts to determine the range of vertical movement of the rod 22. At its upper end the section 22a is fitted with a collar 42 and washer 44, said washer resting upon a spring 46 which, in turn, rests upon a washer 48 carried on the upper end of a threaded sleeve 50 which is vertically adjustable in a bracket 52 extending from a side wall 32a of the switch box 32.

The rod 22 is thus yieldingly held at the upper limit of its movement, as seen in Fig. 2. As the sand or other granular material accumulates in the lower portion of the bin 16, the level of such material will gradually rise above the rim 20a of the shell 20, and as it accumulates above this level the weight of the granular material will press downwardly upon the outer and upwardly exposed surface of the shell 20, which, as shown in the drawings, is its conical surface. This will tend to move the shell 20 downwardly, and such movement will be resisted only by the strength of the spring 46 and by the accumulated granular material pressing upwardly against the downwardly exposed surface of the rim at 20a. Since the area of this rim is quite small as compared with the outer conical area of the shell 20 exposed to the weight of the granular material, the downward pressure will exceed the upward resistance of the material, and the spring 46 may be made light enough to yield to the difference of pressure before the shell 20 has become entirely submerged. At some such level as that indicated in Fig. 1, therefore, the rod 22 will be pulled downwardly until its stop nut 38 engages the wall 32a of the switch box. This movement will be sufficient for the actuation of an electric switch 54 mounted in the box 32 and having an operating arm 56 which is shown engaging under the washer 44 on the upper section 22a of the rod. Lead wires 58 and 59 may extend from the switch to any suitable signal device, such as the lamp shown diagrammatically at A in Fig. 2; or the switch may energize a relay or other electrically actuated mechanism, so as to either notify those in charge to suspend further feeding of material into the bin or to automatically shut off the supply.

For some purposes it is also desirable to either give a warning or actuate a feed mechanism when the available supply in the bin reaches a predetermined minimum level. In such instances, indicating means will be provided for showing the desirable maximum level and also the desirable minimum level in the bin 10. Fig. 4 illustrates such an arrangement, in which the maximum level is indicated by means of a shell or cone 20 which, in this case, is attached to a tubular rod 60 provided with stop nuts 62 and 64 which are engageable with the bottom wall 66 of a switch box 68. Except that the rod 60 is tubular instead of solid, the mechanism of this indicator is exactly similar to that already described, and includes an electric switch 70 having an actuating arm 72 which is moved by a flange or washer 74 carried at the upper end of the tubular rod 60. A spring 76 yieldingly upholds the rod while accumulation of granular material over the cone 20 tends to move the rod downwardly and close the switch 72 for giving the desired signal or shutting off the feed of material.

The predetermined lower or minimum level is indicated by means of a conical shell 80 disposed in the lower portion of the bin section 16 and carried on the end of a rod 82 which is similar to the rod 22, previously described. Said rod 82 extends upwardly and slidably through the tubular rod 60 to a coupling 84 by which it is connected to an upper rod section 82a provided with stop nuts 86 and 90 in a switch box 92. The switch mechanism in the box 92 is substantially the same as that shown in the box 32 in Fig. 2, and the rod 82 is provided with a spring 94 which yieldingly upholds the weight of the rod and the cone 80. When the granular material accumulates in the lower portion 16 of the bin and entirely covers the cone 80, as indicated in Fig. 4, the weight of this material overcomes the upward pressure against the annular rim 80a of the cone 80, and also overcomes the force of the spring 94 and shifts the rod 82 downwardly to the limit permitted by its stop nut 90, thus actuating the switch 96 in the switch box 92.

If preferred, the downward movement of the rod 82 may open the switch; then as the material in the bin section 16 is used, and the level recedes to the rim 80a of the conical shell 80, the spring 94 will shift the rod 82 upwardly and allow the switch 96 to close, thus giving a visual or audible signal, advising that the bin should be refilled, or operating a relay or other mechanism to automatically effect the refilling operation. Fig. 4 shows diagrammatically a signal lamp $B^1$ controlled by the switch 70, and a signal lamp $B^2$ controlled by the switch 96.

It is common practice to mix with molding sand a quantity of molasses or other sticky material, to improve the adhesive qualities of the same, and to prevent this from interfering with the free flow of the material in the bin 16 the cones 20 and 80 of the level indicating mechanism may be provided with electrically energized heating coils 100 which will serve to prevent the molding sand from adhering to the outer surface of either cone and thus interfering with the proper operation of the indicating mechanism.

In Fig. 2 the rod 22 is shown fitted with a collar 22b of sponge rubber or the like, which rests initially upon the upper surface of the guide sleeve 28 when the rod is at its upper limit. When the rod is depressed the material of the collar 22b remains rigidly adherent to the rod but is compressed or distorted to permit the limited vertical movement while maintaining contact with the sleeve 28 so as to exclude the sand or other granular material from the guide surface of the sleeve. Similar collars 22b are shown on the members 60 and 82 in Fig. 4.

The adjustability of the threaded sleeve 50 in the bracket 52 permits varying the effective strength of the spring 46 as desired. This may be done to increase or decrease the depth of sand required to actuate the indicating device, or it may serve to accommodate the mechanism for use with different materials at different times, for example, various grains, sawdust, gravel or sand.

While I have shown and described herein certain structures embodying my invention and illustrative thereof, it is to be understood that the invention is not limited thereto or thereby, but embraces all changes and modifications in its various features which may come within the scope of the appended claims.

I claim:

1. A device for actuating an indicator in response to changes in the level of a granular material stored in a bin or the like to show maximum and minimum levels comprising a pair of downwardly open shells, one of which is located adjacent the upper end of the bin and the other adjacent the lower end, a telescopically arranged pair of stems, one of which is attached to one of said shells and the other of which is attached to the other shell, and means normally biasing said stems to a nonindicating position, one of said stems being adapted to actuate said indicator to show a minimum level and the other of said stems being adapted to actuate said indicator to indicate a maximum level upon movement of the stems in opposition to said biasing means.

2. A device for actuating an indicator in response to changes in the level of a granular material stored in a bin or the like, comprising a downwardly open shell in said bin having an upwardly exposed surface substantially greater in area than the downwardly exposed surface of its rim, a vertically reciprocable member attached to said shell and actuated thereby for actuating said indicator, and means supported within said shell for heating the same.

3. A device for actuating an indicator in response to changes in the level of a granular material stored in a bin or the like, comprising a downwardly open shell in said bin having an upwardly exposed surface substantially greater in area than the downwardly exposed surface of its rim, a vertically reciprocable member attached to said shell and actuated thereby for actuating said indicator, and electrically energized heat radiating means mounted within said shell.

4. A device for actuating an indicator in response to a change in the level of a granular material stored in a storage bin or the like, comprising a downwardly open shell in said bin having an upwardly exposed surface substantially greater in area than the downwardly exposed surface of its rim, a member reciprocable with said shell for actuating said indicator, fixed means above the maximum level of the material in said bin through which said reciprocable member passes and relative to which it is reciprocable, a pair of nuts on said reciprocable member on opposite sides of said fixed means, and means to lock said nuts spaced from each other a predetermined distance, said nuts being engageable with said fixed means to determine the limits of movement of said reciprocable member.

5. A device for actuating indicating means in response to a rise or drop in the level of granular material disposed in a bin relative to a plurality of predetermined levels, comprising a downwardly open shell arranged at each level, vertically extending, telescopically arranged, independently reciprocable stems, one being secured to each shell, means biasing each stem upwardly and being yieldable to permit downward movement of the respective shell by the weight of material upon the same when the level of material exceeds the predetermined level corresponding to said last-mentioned shell, each stem being connected with said indicating means and serving to actuate the same to indicate rise and fall relative to its respective level, each stem having independent bracket means mounted upon said bin for guiding and supporting said stem.

6. A device as described in claim 5 in which each shell has electrically energized heat radiating means mounted within same.

CHARLES W. PARISI.

REFERENCES CITED

The following references are of record in the file of this patent:

UNITED STATES PATENTS

| Number | Name | Date |
|---|---|---|
| 674,112 | Baker | May 14, 1901 |
| 848,519 | Versteeg | Mar. 26, 1907 |
| 1,237,735 | Wright | Aug. 21, 1917 |
| 1,891,771 | Mendenhall et al. | Dec. 20, 1932 |
| 1,934,545 | Langdon | Nov. 7, 1933 |
| 1,939,368 | Rydmark et al. | Dec. 12, 1933 |
| 2,298,007 | Goepfrich | Oct. 6, 1942 |

FOREIGN PATENTS

| Number | Country | Date |
|---|---|---|
| 463,280 | Great Britain | Mar. 25, 1937 |
| 516,328 | Great Britain | Dec. 29, 1939 |